US012776703B2

(12) United States Patent
Cohen

(10) Patent No.: US 12,776,703 B2
(45) Date of Patent: Oct. 27, 2026

(54) POWER FACTOR CORRECTION CONVERTER SYSTEM

(71) Applicant: TEXAS INSTRUMENTS INCORPORATED, Dallas, TX (US)

(72) Inventor: Isaac Cohen, Dix Hills, NY (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 121 days.

(21) Appl. No.: 18/679,565

(22) Filed: May 31, 2024

(65) Prior Publication Data

US 2025/0373153 A1 Dec. 4, 2025

(51) Int. Cl.
*H02M 1/42* (2007.01)
*H02M 7/217* (2006.01)

(52) U.S. Cl.
CPC ......... *H02M 1/4208* (2013.01); *H02M 7/217* (2013.01)

(58) Field of Classification Search
CPC ............................ H02M 1/4208; H02M 7/217
See application file for complete search history.

(56) References Cited

U.S. PATENT DOCUMENTS 9,966,841 B2 * 5/2018 Choudhury ......... H02M 1/4225
2011/0102950 A1 * 5/2011 Park .................... H02M 1/4225 361/18
2015/0188413 A1 * 7/2015 Choudhury ......... H02M 1/4208 307/31
2022/0360167 A1 * 11/2022 Sun ........................ G01R 19/02

* cited by examiner

*Primary Examiner* — Rafael O De Leon Domenech
(74) *Attorney, Agent, or Firm* — Charles F. Koch

(57) ABSTRACT

In a described example, a circuit can include a reference controller and a gain adjuster. The reference controller is configured to sample an input voltage from an input stage of the circuit and generate a modulation signal based on a square of the input voltage and an output current of an output stage of the circuit using an error amplifier. The modulation signal is configured to modulate conduction of a switch of a power factor correction (PFC) converter of the circuit to cause an average output current of the output stage of the circuit to follow a reference proportional to the square of the input voltage. The gain adjuster is configured to adjust a gain of the error amplifier based on the input voltage.

21 Claims, 5 Drawing Sheets

POWER FACTOR CORRECTION CONVERTER SYSTEM

TECHNICAL FIELD

This description relates to a power factor correction (PFC) converter system.

BACKGROUND

Power factor correction (PFC) shapes an input current of a power supply to be in synchronization with a mains voltage, in order to maximize the real power drawn from the mains. In an ideal PFC circuit, the input current follows the input voltage as a pure resistor, without any input current harmonics. PFC circuits are used in AC power distribution systems to improve energy transfer efficiency. Passive PFC circuits use a filter to pass current at a desired frequency or frequency range to improve the power factor. Active PFC circuits change the waveform of current drawn by a load to improve the power factor. In active PFC circuits, switches are employed. The operations of such switches consume power and affect the efficiency of the PFC circuit.

SUMMARY

In a described example, a circuit can include a reference controller. The reference controller is configured to sample an input voltage from an input stage of the circuit and generate a modulation signal based on a square of the input voltage. The modulation signal is configured to modulate conduction of a switch of a power factor correction (PFC) converter of the circuit to cause an average output current of an output stage of the circuit to follow a reference proportional to the square of the input voltage.

In a described example, a circuit can include a reference controller and a gain adjuster. The reference controller is configured to sample an input voltage from an input stage of the circuit and generate a modulation signal based on a square of the input voltage and an output current of an output stage of the circuit using an error amplifier. The modulation signal is configured to modulate conduction of a switch of a power factor correction (PFC) converter of the circuit to cause an average output current of the output stage of the circuit to follow a reference proportional to the square of the input voltage. The gain adjuster is configured to adjust a gain of the error amplifier based on the input voltage.

In a described example, a system can include a reference controller. The reference controller can include a voltage sampler, a reference generator, and a gain adjuster. The voltage sampler can include an input and an output, the input of the voltage sampler being adapted to receive an input voltage. The reference generator can include a first input, a second input, and an output, the first input of the reference generator being coupled to the output of the voltage sampler, the output of the reference generator being coupled to an input of a power factor correction (PFC) converter. The gain adjuster can include a first input, a second input, a third input, and an output, the first input of the gain adjuster being adapted to receive the input voltage, the second input of the gain adjuster being adapted to receive a reference voltage, the third input of the gain adjuster being adapted to receive an output current, the output of the gain adjuster being coupled to the second input of the reference generator.

DETAILED DESCRIPTION

This description relates to systems and methods for power factor correction (PFC). PFC is provided by a reference controller, which is configured to sample an input voltage from an input stage of the circuit and an output current of an output stage. As described herein, the term "input stage" refers to relevant circuitry of a PFC converter system corresponding to a portion of the PFC converter system that receives at least one input (e.g., an input voltage) to provide operational functionality of the PFC converter system. As described herein, the term "output stage" refers to relevant circuitry of a PFC converter system corresponding to a portion of the PFC converter circuit that provides a regulated output voltage of the PFC converter circuit based on the operational functionality of the PFC converter system. The reference controller generates a modulation signal based on a comparison between a square of the input voltage and the output current using an error amplifier, for example. The modulation signal is configured to modulate conduction of a switch of a PFC converter to cause an average output current of the output stage of the circuit to follow a reference proportional to the square of the input voltage. Additionally, a gain adjuster can be provided and configured to adjust a gain of the error amplifier based on the input voltage to mitigate zero crossing distortion.

Figure 1:
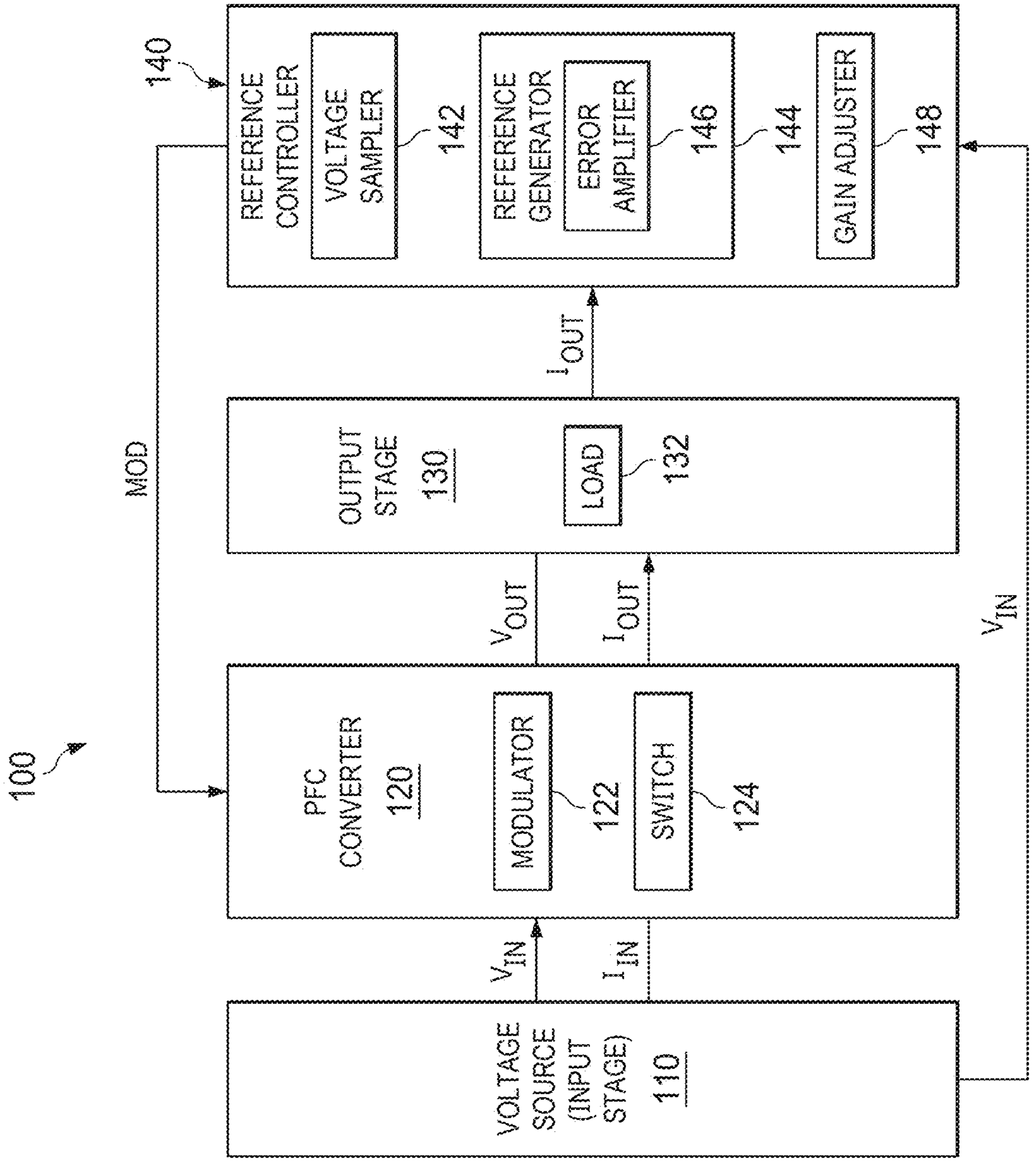
FIG. 1 is a block diagram of a power factor correction (PFC) converter system.

FIG. 1 is a block diagram of a power factor correction (PFC) converter system 100. The PFC converter system 100 can include a voltage source 110, a PFC converter 120, an output stage 130, and a reference controller 140. The PFC converter 120 can include, among other devices, a modulator 122 and a switch 124. The switch 124 can include multiple switches or switching devices (e.g., transistors). The output stage 130 can include a load 132. The reference controller 140 can include a voltage sampler 142, and a reference generator 144 including an error amplifier 146.

The voltage source 110 is located at an input stage for the PFC converter system 100 and is configured to provide an input voltage $V_{in}$ at the input stage. At the output stage 130, the output current $I_{out}$ charges an output capacitor and provides the output voltage $V_{out}$ across the load 132.

The reference controller 140 is configured to generate a modulation signal MOD based on a square of the input voltage $V_{in}^2$ and the output current $I_{out}$ of the output stage 130. For example, the voltage sampler 142 is configured to sample the input voltage $V_{in}$ from the input stage. The reference generator 144 is configured to generate the modulation signal MOD based on a square of the input voltage $V_{in}^2$ and an output current $I_{out}$ of the output stage 130 of the PFC converter system 100 using the error amplifier 146. The modulation signal MOD is configured to modulate conduction of the switch 124 of the PFC converter 120 to cause an average output current $I_{out\_AVG}$ of the output stage 130 to follow a reference proportional to the square of the input voltage (e.g., a $\sin^2$ reference), thereby controlling the output current $I_{out}$ to achieve PFC.

In this regard, it is desirable to regulate the average output current $I_{out\_AVG}$ because the output current $I_{out}$ is generally readily available for PFC topologies (e.g., unlike other currents, such as input current or inductor current, which are difficult to access for bridgeless topologies). For example, PFC control based on the output current $I_{out}$ allows for easier control for bridgeless PFC topologies.

According to one example, to provide unity power factor, the modulation signal MOD can be provided such that the average input power and output power are proportional to the input voltage squared:

$$P_{in} = P_{out} = k * V_{in}^2 \quad (1)$$

Since the output voltage $V_{out}$ is substantially a constant, the average output current $I_{out\_AVG}$ must be proportional to the square of the input voltage:

$$I_{out} = \frac{(k * V_{in}^2)}{V_{out}} = N * V_{in}^2, \text{ where } N = \frac{k}{V_{out}} \quad (2)$$

Consequently, if the average output current $I_{out\_AVG}$ is forced to follow a reference proportional to the square of the input voltage $V_{in}^2$, the average input current $I_{in\_AVG}$ will be proportional to the input voltage $V_{in}$, and the power factor is unity.

The PFC converter 120 can include an input and an output. The input of the PFC converter 120 is coupled to the output of the reference controller 140 or the output of the reference generator 144. The output of the PFC converter 120 is coupled to the load 132. The modulator 122 of the PFC converter 120 is configured to control the switch 124 based on the modulation signal MOD. For example, the modulator 122 can adjust a duty cycle, a duration of activation for the switch 124, a frequency, etc. for modulation of the switch 124 based on the modulation signal MOD received.

As described herein, the term "activate" with respect to a switch refers to closing the switch to provide current flow through the switch. Therefore, activating the switch can correspond to providing sufficient bias to a transistor (e.g., Vas voltage) greater than a threshold voltage (e.g., a threshold voltage VT) to operate in a linear or a saturation mode.

In any event, the modulator 122 is configured to modulate conduction of the switch 124 of the PFC converter 120 to cause the average output current $I_{out\_AVG}$ to follow the reference proportional to the square of the input voltage $V_{in}$, thereby causing $I_{in}$ to be proportional to $V_{in}$. Stated another way, the modulator 122 is configured to modulate the average output current $I_{out\_AVG}$ in a way that results in the input current $I_{in}$ following the input voltage $V_{IN}$.

Figure 2:
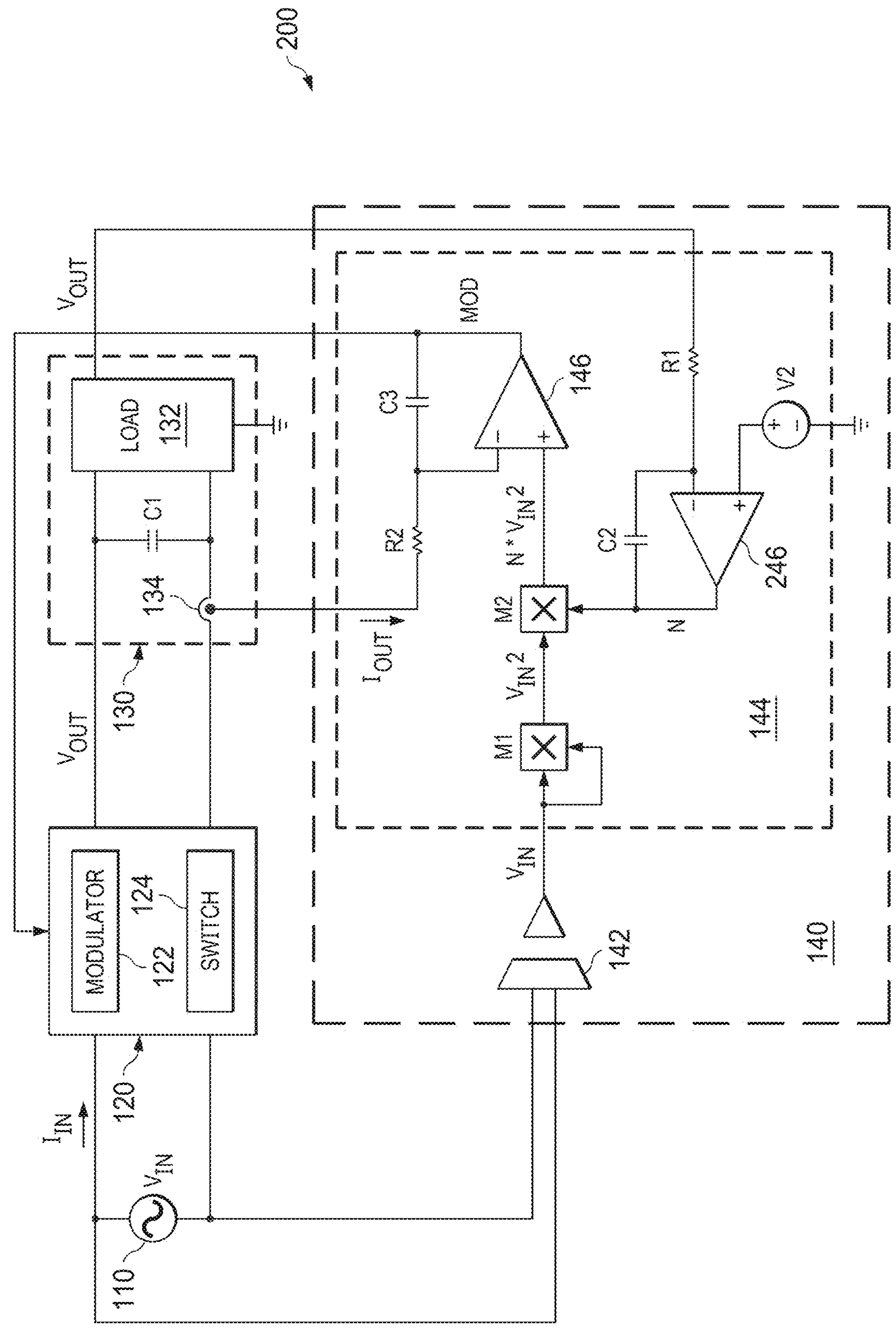
FIG. 2 is a circuit diagram of a power factor correction (PFC) converter circuit.

FIG. 2 is a circuit diagram of a power factor correction (PFC) converter circuit. The circuit 200 can include the voltage source 110, the PFC converter 120 including the modulator 122 and the switch 124, and the output stage 130 including the load 132. At the output stage 130, the output current $I_{out}$ charges the output capacitor C1 and provides the output voltage $V_{out}$ across the load 132. The reference controller 140 can include the voltage sampler 142, the reference generator 144, and the error amplifier 146.

The reference controller 140 can include a first input, a second input, a third input, and an output. The first input of the reference controller 140 is adapted to receive an input voltage $V_{in}$ from the voltage source 110. The second input of the reference controller 140 is coupled to an output of a current sensor 134 located at the output stage 130. The third input of the reference controller 140 is coupled to the load 132. The output of the reference controller 140 is coupled to an input of the PFC converter 120.

The voltage sampler 142 can include an input and an output. The input of the voltage sampler 142 is adapted to receive the input voltage $V_{in}$ from the voltage source 110 and corresponds to the first input of the reference controller 140.

The reference generator 144 can include a first input, a second input, a third input, and an output. The first input of the reference generator 144 is coupled to the output of the voltage sampler 142 and is adapted to receive the input voltage $V_{in}$. The second input of the reference generator 144 is coupled to the output of the current sensor 134 located at the output stage 130, is adapted to receive the output current $I_{out}$, and corresponds to the second input of the reference controller 140. The third input of the reference generator 144 is coupled to the load 132 at the output stage 130, is adapted to receive the output voltage $V_{out}$, and corresponds to the third input of the reference controller 140. The reference generator 144 includes a first multiplication circuit M1 having a first input, a second input, and an output. The first input and the second input of the first multiplication circuit M1 are adapted to receive the input voltage $V_{in}$ from the output of the voltage sampler 142. In this way, the output of the first multiplication circuit M1 produces a signal of the square of the input voltage $V_{in}^2$ based on the input voltage $V_{in}$. Stated another way, the first multiplication circuit M1 receives an input of the input voltage $V_{in}$ and generates an output of a square of the input voltage $V_{in}^2$.

The reference generator 144 includes a second multiplication circuit M2 having a first input, a second input, and an output. The first input of the second multiplication circuit M2 is coupled to the output of the first multiplication circuit M1 (e.g., providing the signal of the square of the input voltage $V_{in}^2$). The second input of the second multiplication circuit M2 is coupled to an output of a first error amplifier 246, which generates a first error signal $$N = \frac{k}{V_{out}},$$

from Equation (2) above. The output of the second multiplication circuit M2 is a product of the output of the first multiplication circuit M1 ($V_{in}^2$) and the output of the first error amplifier 246

$$\left(N = \frac{k}{V_{out}}\right).$$

In this way, the second multiplication circuit M2 is configured to generate a product signal $N*V_{in}^2$ based on a first error signal from the first error amplifier 246 and the signal of the square of the input voltage $V_{in}^2$. Therefore, the product signal $N*V_{in}^2$ or the output of the second multiplication circuit M2 is in accordance with Equation (2).

The first error amplifier 246 has a first input, a second input, and an output. The first input of the first error amplifier 246 is coupled to the load 132, adapted to receive the output voltage $V_{out}$ from the load 132 through a resistor R1, and corresponds to the third input of the reference controller 140. Additionally, the first input of the first error amplifier 246 is coupled to the output of the first error amplifier 246 through a capacitor C2. The second input of the first error amplifier 246 is coupled to a reference voltage V2. The first error amplifier 246 generates a difference between the output voltage $V_{out}$ of the load 132 and the reference voltage V2 as the first error signal N. In other words, the first error amplifier 246 is configured to generate the first error signal N based on the output voltage $V_{out}$ and the reference voltage V2. The first error signal N of the first error amplifier 246 is coupled to the second input of the second multiplication circuit M2.

The reference generator 144 includes a second error amplifier 146 having a first input, a second input, and an output. The first input of the second error amplifier 146 is coupled to an output of a current sensor 134 located at the output stage 130 through a resistor R2 and adapted to receive the output current $I_{out}$. Additionally, the first input of the second error amplifier 146 is coupled to the output of the second error amplifier 146 through a capacitor C3. The second input of the second error amplifier 146 is coupled to the output of the second multiplication circuit M2 and adapted to receive the product signal $N*V_{in}^2$. Thus, the second error amplifier 146 is configured to compare the output current $I_{out}$ to the product signal $N*V_{in}^2$ and generate the modulation signal based on the product signal $N*V_{in}^2$ and a voltage associated with the output current $I_{out}$. The output of the second error amplifier 146 is coupled to the input of the PFC converter 120. In this way, the second error amplifier 146 generates the modulation signal MOD to cause $I_{out}$ measured from the current sensor 134 to $$I_{out} = \frac{(k*V_{in}^2)}{V_{out}} = N*V_{in}^2,$$

as indicated by Equation (2). Additionally, the output of the reference generator 144 is coupled to the input of the PFC converter 120 and corresponds to the output of the reference controller 140.

With reference to FIG. 1, zero crossing distortion can occur due to ripple content at the output current $I_{out}$. For example, when the voltage is at a near-zero value, a longer conduction time may be needed to enable the input current $I_{in}$ to follow the input voltage $V_{in}$. In other words, at around the zero crossing, the error amplifier 146 may be too slow to reach the value necessary for the correct duty cycle. However, the error amplifier 146 may not be able to allow the output to go high fast enough. In this regard, by increasing the amplifier bandwidth of the error amplifier 146 around the zero crossing, zero crossing distortion is eliminated. In the example of FIG. 1, the reference controller 140 includes a gain adjuster 148 to adjust or increase a gain of the error amplifier 146 based on the input voltage $V_{in}$ dropping below a threshold value. In this way, adaptive current error amplifier bandwidth, time constant (TC) modification, or gain adjustment to the error amplifier 146 provides the advantage of minimizing, mitigating, or eliminating zero crossing distortion or crossover distortion and improving the quality of the waveform by allowing current to increase more rapidly, and thus, providing a more improved performance of PFC during zero crossing.

Figure 3:
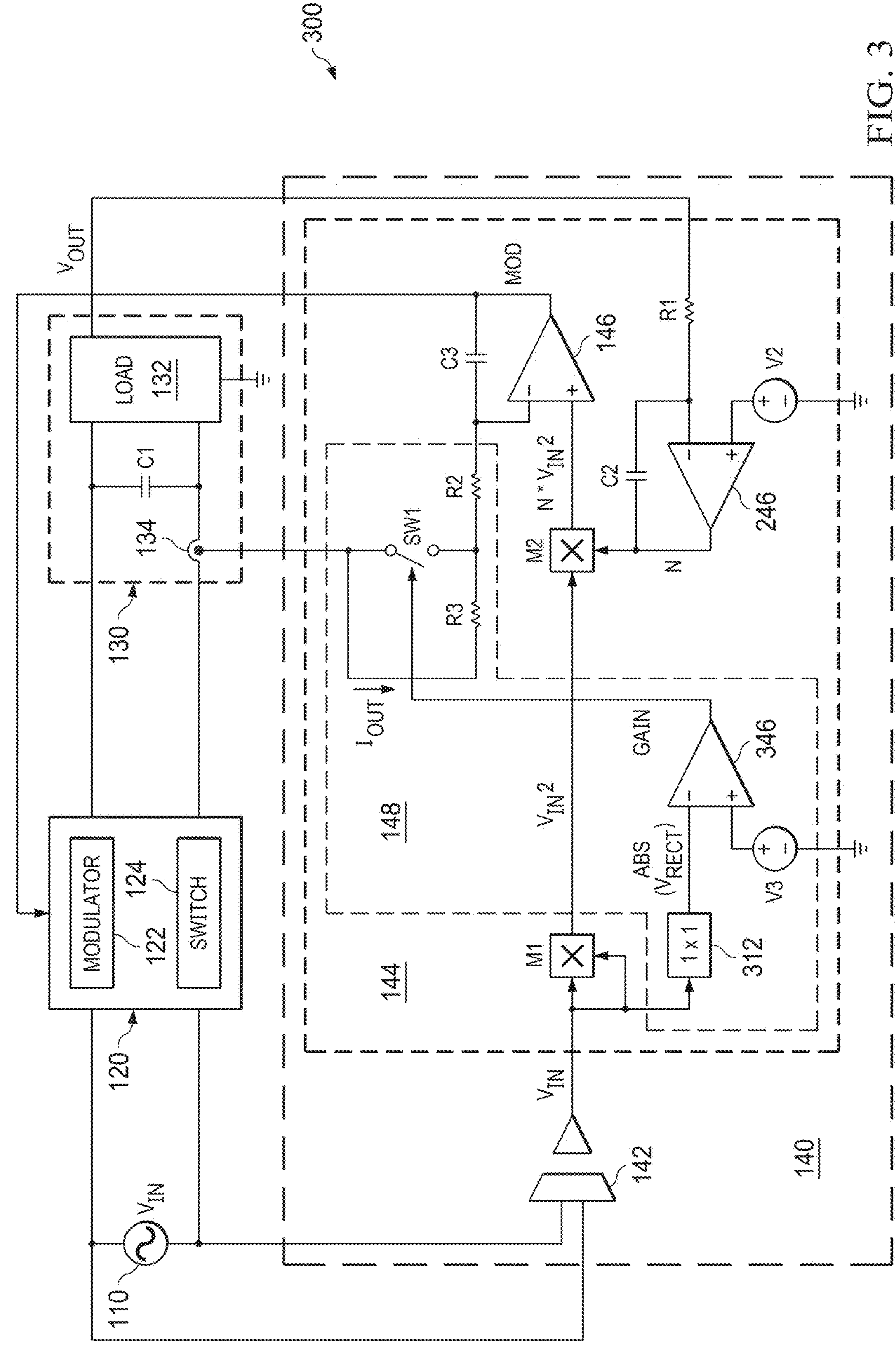
FIG. 3 is a circuit diagram of a circuit for power factor correction (PFC).

FIG. 3 is a circuit diagram of a power factor correction (PFC) converter circuit. The circuit 300 of FIG. 3 is similar to the circuit 200 of FIG. 2 except that the reference controller 140 includes a gain adjuster, such as the gain adjuster 148 of FIG. 1. With reference to FIG. 1, the reference controller 140 can also include a gain adjuster, such as the gain adjuster 148 of FIG. 3. According to one example, the circuit 300 of FIG. 3 is a PFC converter circuit and includes the PFC converter 120 including the modulator and the switch. The gain adjuster 148 can include a first input, a second input, a third input, and an output. The first input of the gain adjuster 148 is adapted to receive the input voltage $V_{in}$. The second input of the gain adjuster 148 is adapted to receive a reference voltage V3. The third input of the gain adjuster 148 is adapted to receive the output current $I_{out}$. The output of the gain adjuster 148 is coupled to the second input of the reference generator 144 (e.g., at the first input of the second error amplifier 146).

The gain adjuster 148 can include an absolute value circuit 312 having an input and an output. The input of the absolute value circuit 312 corresponds to the first input of the gain adjuster 148. The input of the absolute value circuit 312 is adapted to receive the input voltage $V_{in}$ from the output of the voltage sampler 142. The absolute value circuit 312 is configured to generate an output signal as an absolute value signal ABS which is an absolute value of the input signal (e.g., the input voltage $V_{in}$). In this way, the absolute value circuit 312 is configured to generate the absolute value signal ABS based on the input voltage $V_{IN}$. For example, if the input voltage $V_{in}$ is a sinusoidal waveform, the output to the absolute value circuit 312 is a full wave rectified sine wave. In this way, the gain adjuster 148 is configured to adjust the gain of the error amplifier 146 of the reference controller 140 based on a rectified input voltage $V_{RECT}$.

The gain adjuster 148 can include a comparator 346 having a first input, a second input, and an output. The first input of the comparator 346 is coupled to the output of the absolute value circuit 312 (e.g., the ABS signal) and associated with a voltage $V_{RECT}$. The second input of the comparator 346 is coupled to a reference voltage V3. The comparator 346 is configured to generate a GAIN signal based on the absolute value signal ABS and the reference voltage V3 by comparing the two signals. In this way, the output of the comparator 346 is configured to generate the GAIN signal and is coupled to a control for a gain adjustment switch SW1, which controls the time constant for the second error amplifier 146 based on the GAIN signal.

For example, when the input voltage $V_{in}$ drops below the reference voltage V3 (e.g., a threshold value), the gain adjustment switch SW1 adjusts the gain for the second error amplifier 146. For example, the gain adjustment switch SW1 is configured to switch or toggle between a first position and a second position. In the first position, the gain adjustment switch SW1 connects the current sensor 134 in series to resistors R3 and R2, and to the first input of the second error amplifier 146. In the second position, the gain adjustment switch SW1 connects the current sensor 134 in series to R2 and to the first input of the second error amplifier 146. In this way, the gain adjustment switch SW1 is configured to adjust the gain of the second error amplifier 146 by adjusting the resistance (e.g., R2 or R3+R2) at the first input of the second error amplifier 146 based on the GAIN signal. Therefore, the gain adjustment switch SW1 adjusts or increases the time constant when the input voltage $V_{in}$ drops below the reference voltage V3, thereby mitigating zero crossing distortion. In this way, the gain adjuster 148 provides a simple solution and a significant benefit to the PFC performance for the PFC converter system 100 and/or circuits 200, 300.

Figure 4A:
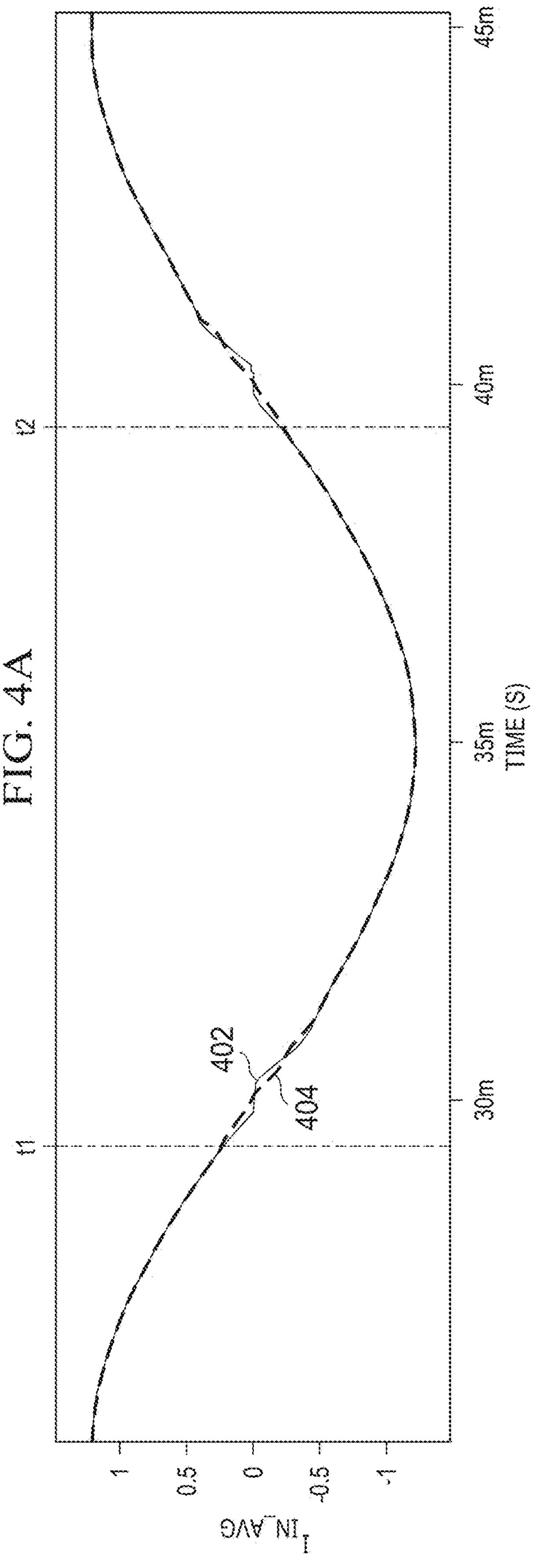
FIGS. 4A-4B are timing diagrams of waveforms associated with the circuits for power factor correction (PFC) of FIGS. 2-3.
Figure 4B:
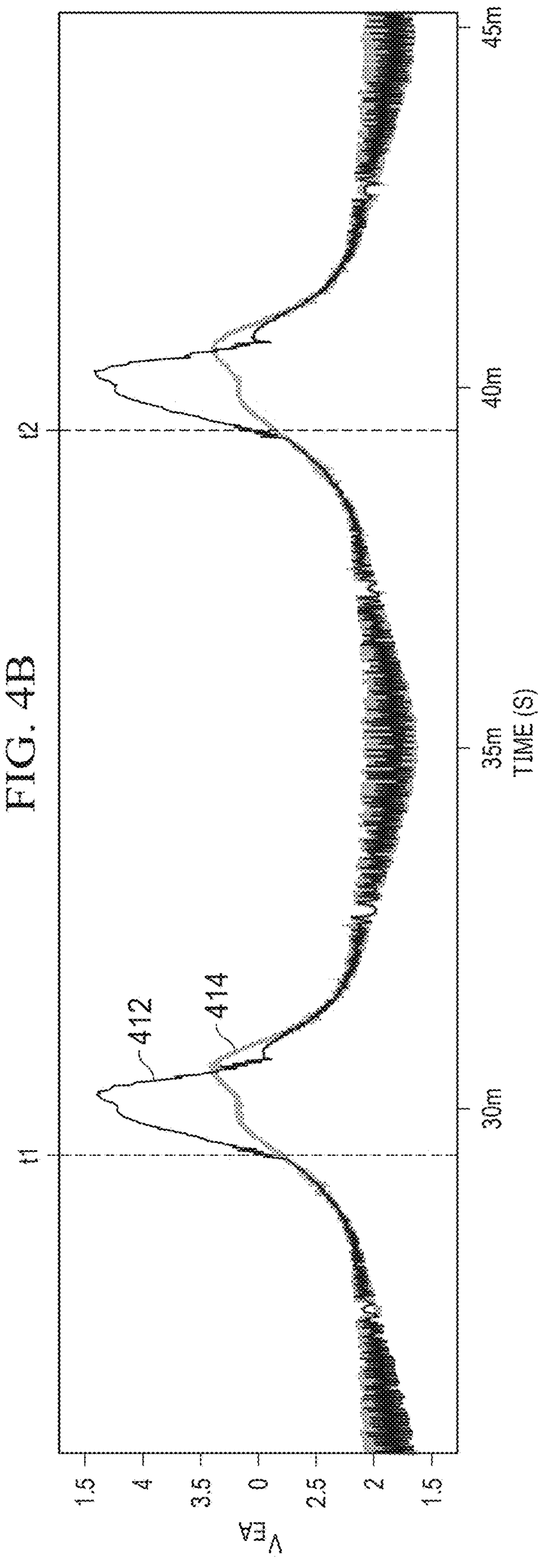

FIGS. 4A-4B are timing diagrams of waveforms associated with the circuits 200, 300 for power factor correction (PFC) of FIGS. 2-3. In FIG. 4A, zero crossing distortion is seen at waveform 402 of the average input current $I_{in\_AVG}$ which is associated with circuits with fixed gain (e.g., without adaptive current error amplifier bandwidth modification or gain adjustments). Waveform 404 of gain adjusted average input current $I_{in\_AVG}$ illustrates a waveform where zero crossing distortion is minimized, such as using the gain adjuster 148 of FIG. 3 to provide adaptive gain. As seen, waveform 402 includes zero crossing distortion, while waveform 404 has little, if any zero crossing distortion. In FIG. 4B, the voltage (e.g., $V_{EA}$) associated with the second input of the reference generator 144 or error amplifier 146 is illustrated for a fixed gain scenario 412 (e.g., without using the gain adjuster 148 of FIG. 3) and an adaptive gain scenario 414 (e.g., using the gain adjuster 148 of FIG. 3). For example, around time t1 and t2, the absolute value of waveform 402 is below a zero crossing distortion threshold (e.g., reference voltage V3), and thus, approaching a zero crossing. In this regard, the voltage (e.g., $V_{EA}$) associated with the second input of the error amplifier 146 is greater in corresponding waveform 412 (e.g., compared to waveform 414) when there is a fixed gain (e.g., without adaptive current error amplifier bandwidth modification). In the fixed gain scenario, the gain adjustment switch SW1 is in the second position, and connects the current sensor 134 in series to resistor R2 and to the first input of the second error amplifier 146 (e.g., less resistance relative to both resistor R3 and resistor R2 in the first position, and thus, a higher $V_{EA}$).

Conversely, the voltage (e.g., $V_{EA}$) associated with the second input of the error amplifier 146 is less in corresponding waveform 414 (e.g., compared to waveform 412) when there is adaptive current error amplifier bandwidth modification. In the adaptive current error amplifier bandwidth modification scenario, the gain adjustment switch SW1 is in the first position, and connects the current sensor 134 in series to resistor R3, resistor R2, and to the first input of the second error amplifier 146 (e.g., an increased resistance relative to only resistor R2 in the second position, and thus, a lower $V_{EA}$), thereby eliminating zero crossing distortion or crossover distortion, as seen in waveform 404 of FIG. 4A.

In this description, the term "couple" can cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

In this description, a device that is "configured to" perform a task or function is configured (e.g., programmed and/or hardwired) at a time of manufacturing by a manufacturer to perform the function and/or can be configurable (or reconfigurable) by a user after manufacturing to perform the function and/or other additional or alternative functions. The configuring can be through firmware and/or software programming of the device, through a construction and/or layout of hardware components and interconnections of the device, or a combination thereof. Furthermore, a circuit or device that is described herein as including certain components can instead be configured to couple to those components to form the described circuitry or device. For example, a structure described herein as including one or more semiconductor elements (such as transistors), one or more passive elements (such as resistors, capacitors, and/or inductors), and/or one or more sources (such as voltage and/or current sources) can instead include only the semiconductor elements within a single physical device (e.g., a semiconductor die and/or integrated circuit (IC) package) and is configured to couple to at least some of the passive elements and/or the sources to form the described structure, either at a time of manufacture or after a time of manufacture, such as by an end-user and/or a third-party.

The phrase "based on" means "based at least in part on". Therefore, if X is based on Y, X can be a function of Y and any number of other factors.

Modifications are possible in the described embodiments, and other embodiments are possible, within the scope of the claims.

What is claimed is:

1. A circuit, comprising:

a controller having a current sense input, a voltage sense input, and a control output and configurable to:

receive a first signal at the voltage sense input indicative of an input voltage of a power factor correction (PFC) circuit;

generate a reference signal responsive to the first signal;

receive a second signal at the current sense input indicative of an output current of the PFC circuit; and provide a modulation signal at the control output responsive to the second signal and the reference signal.

2. The circuit of claim 1, wherein the controller includes:

an amplifier having a first input coupled to the voltage sense input, a second input coupled to the current sense input, and an output coupled to the control output; and a gain adjuster coupled between the voltage sense input and the first input of the amplifier, the gain adjuster configurable to adjust a gain of the amplifier responsive to a rectified input voltage.

3. The circuit of claim 1, wherein the PFC controller includes a multiplication circuit configurable to generate a third signal of a square of the first signal.

4. The circuit of claim 3, wherein the amplifier is a first amplifier, the controller includes a second amplifier having inputs coupled to an output of the PFC circuit and a reference terminal, an output of the second amplifier coupled to the first input of the first amplifier.

5. The circuit of claim 4, wherein the multiplication circuit is a first multiplication circuit, and the controller includes a second multiplication circuit having inputs coupled to the output of the first multiplication circuit and to the output of the second amplifier, and an output coupled to the first input of the first amplifier, the second multiplication circuit configurable to provide the reference signal.

6. The circuit of claim 5, wherein the reference generator is proportional to the square of the input voltage.

7. The circuit of claim 1, further comprising the PFC circuit, the PFC circuit including a switch; and a modulator configurable to modulate conduction of the switch responsive to the modulation signal.

8. A circuit, comprising:

a controller having a current sense input, a voltage sense input, and a control output and configurable to:

receive a first signal at the voltage sense input indicative of an input voltage of a power factor correction (PFC) circuit;

receive a second signal at the current sense input indicative of an output current of the PFC circuit; and provide a modulation signal at the control output responsive to a relationship between the output current and the input voltage.

9. The circuit of claim 8, wherein the controller includes:

an amplifier having a first input coupled to the voltage sense input, a second input coupled to the current sense input, and an output coupled to the control output;

a gain adjuster coupled between the voltage sense input and the first input of the amplifier, the gain adjuster configurable to adjust a gain of the amplifier responsive to a rectified input voltage; and a multiplication circuit configurable to generate a third signal of athe square of the first signal.

10. The circuit of claim 9, wherein the amplifier is a first amplifier, the controller includes a second amplifier having inputs coupled to the voltage sense input and a reference terminal, an output of the second amplifier coupled to the first input of the first amplifier.

11. The circuit of claim 10, wherein the multiplication circuit is a first multiplication circuit, and the controller includes a second multiplication circuit having inputs coupled to the output of the first multiplication circuit and to the output of the second amplifier, and an output coupled to the first input of the first amplifier, the second multiplication circuit configurable to provide a reference signal, and the first amplifier is configurable to provide the modulation signal responsive to the second signal and the reference signal.

12. The circuit of claim 11, wherein the gain adjuster comprises an absolute value circuit configured to generate an absolute value signal based on the input voltage.

13. The circuit of claim 12, wherein the gain adjuster comprises a comparator configured to generate a gain signal based on the absolute value signal and a second reference voltage.

14. The circuit of claim 8, wherein the controller is configurable to generate a reference signal based on a square of the input voltage and provide the modulation signal responsive to a difference between the output current and the reference signal.

15. The circuit of claim 13, wherein the gain adjuster is configured to adjust the gain by adjusting a resistance at the second input of the first amplifier responsive to the gain signal.

16. The circuit of claim 15, wherein the gain adjuster comprises a gain adjustment switch configured to adjust the resistance at the second input of the first amplifier by toggling between at least a first position and a second position.

17. The circuit of claim 8, further comprising the PFC circuit, the PFC circuit including a switch and a modulator configurable to modulate conduction of the switch responsive to the modulation signal.

18. . A system, comprising:

a power factor correction (PFC) circuit coupled between alternating current (AC) terminals and an output terminal, the PFC circuit including a switch; and a controller having a current sense input coupled to the output terminal, a voltage sense input coupled to the AC terminals, and a control output coupled to the switch and configurable to:

receive a first signal at the voltage sense input indicative of an input voltage at the AC terminals;

receive a second signal at the current sense input indicative of a current of at the output terminal; and provide a modulation signal at the control output responsive to a relationship between the current and the input voltage.

19. The system of claim 18, comprising:

an output stage coupled to the output terminal, the output stage having a current return path coupled to the PFC circuit, wherein the current sense input is coupled to a current return path of the output stage.

20. The system of claim 18, wherein the controller includes:

a voltage sampler including an input coupled to the voltage sense input and an output;

a reference generator including a first input, a second input, and an output, the first input of the reference generator being coupled to the output of the voltage sampler, the output of the reference generator being coupled to the control output; and a gain adjuster including a first input, a second input, a third input, and an output, the first input of the gain adjuster coupled to the voltage sense input, the second input of the gain adjuster coupled to a first reference terminal, the third input of the gain adjuster coupled to the current sense input, and the output of the gain adjuster coupled to the second input of the reference generator;

wherein the reference generator includes:

a first multiplication circuit having a first input, a second input, and an output;

a second multiplication circuit having a first input, a second input, and an output;

a first error amplifier having a first input, a second input, and an output; and a second error amplifier having a first input, a second input, and an output, wherein the first input and the second input of the first multiplication circuit are coupled to the output of the voltage sampler, wherein the first input of the second multiplication circuit is coupled to the output of the first multiplication circuit, wherein the second input of the second multiplication circuit is coupled to the output of the first error amplifier, wherein the first input of the first error amplifier is coupled to the output terminal, wherein the second input of the first error amplifier is coupled to a second reference terminal, wherein the first input of the second error amplifier is coupled to the current sense input, wherein the second input of the second error amplifier is coupled to the output of the second multiplication circuit, and wherein the output of the second error amplifier is coupled to control output.

21. The system of claim 20, wherein the gain adjuster comprises:

an absolute value circuit having an input and an output;

a comparator having a first input, a second input, and an output; and a gain adjustment switch configured to switch between a first position and a second position, wherein the input of the absolute value circuit is coupled to the output of the voltage sampler, wherein the first input of the comparator is coupled to the output of the absolute value circuit, wherein the second input of the comparator is coupled to the first reference terminal, wherein the output of the comparator is coupled to a control for the gain adjustment switch, wherein the first position for the gain adjustment switch couples the first input of the second error amplifier to the current sense input through a first resistor, and wherein the second position for the gain adjustment switch couples the first input of the second error amplifier to the current sense input through a second resistor.

* * * * *